United States Patent [19]
Hunter, Jr. et al.

[11] 3,752,099
[45] Aug. 14, 1973

[54] SYSTEM OF MAKING WAISTBANDS WITH CRIMPED BELT LOOPS, LABELS AND TICKETS

[75] Inventors: John P. Hunter, Jr., Dunwoody; Erie George Huddleston, Monroe, both of Ga.

[73] Assignee: Oxford Industries Inc., Atlanta, Ga.

[22] Filed: Oct. 13, 1972

[21] Appl. No.: 297,476

Related U.S. Application Data

[60] Division of Ser. No. 097,489, Dec. 14, 1970, Pat. No. 3,710,398, which is a continuation-in-part of Ser. No. 851,986, Aug. 21, 1969, Pat. No. 3,562,817.

[52] U.S. Cl. ............... 112/121.27, 2/271, 156/443, 223/1, 270/61 R, 161/99
[51] Int. Cl. .......................................... D05b 23/00
[58] Field of Search ............. 112/121.27, 121.26, 112/130, 104, 2, 262; 270/61 R; 2/236, 271; 156/227, 204, 443; 161/99; 223/1

[56] References Cited
UNITED STATES PATENTS

| | | | |
|---|---|---|---|
| 2,144,084 | 1/1939 | Resenthal | 270/61 R |
| 2,146,934 | 2/1939 | Burkey | 270/61 R |
| 2,158,144 | 5/1939 | Oskow | 270/61 R |
| 2,744,844 | 5/1956 | Wood, Jr. et al. | 156/227 X |
| 2,964,312 | 12/1960 | Schmidt | 270/61 R |
| 3,094,084 | 6/1963 | Hedegaard | 112/104 |
| 3,699,907 | 10/1972 | Anderson et al. | 112/121.27 |
| 2,821,385 | 1/1958 | Hoffee | 112/121.27 X |

*Primary Examiner*—James R. Boler
*Attorney*—George M. Thomas

[57] ABSTRACT

A method of making waistbands for pants and other garments wherein a series of waistband panels are joined together in end-to-end relationship to form a continuous series of waistband panels, a continuous band of facing material is fed into abutting relationship with one edge of the series of panels and is continuously rocaped to the series of panels. The panels are marked and belt loop material is fed in a continuous strip toward the panels, cut to proper length, the lengths are crimped and folded at their ends and sewn to the panels in positions corresponding to the markings. Labels are sewn to the facing material at positions corresponding to the ends of the panels, sales tickets are basted to waistband panels, the panels are separated and the facing material is cut at positions adjacent the ends of the waistband panels alternately with a straight cut extending across the facing material and with a Y-shaped cut to remove a portion of the facing material.

6 Claims, 5 Drawing Figures

SYSTEM OF MAKING WAISTBANDS WITH CRIMPED BELT LOOPS, LABELS AND TICKETS

CROSS REFERENCE TO RELATED APPLICATION

This application is a division of appliation Ser. No. 097489, filed Dec. 14, 1970, now U.S. Pat. No. 3,710,398, which is a continuation-in-part of application Ser. No. 851,986, filed Aug. 21, 1969 entitled "Method of Making Waistbands," now U.S. Pat. No. 3,562,817.

BACKGROUND OF THE INVENTION

In the manufacture of waistbands for pants and similar garments, the pant leg, belt loops, and the outer waistband panel for a single pant leg assembly usually are cut from the same portion of material so that the various garment parts of the assembled pant leg and its mating pant leg will be color coordinated. Care must be taken in the handling and connection of the garment parts to ensure that the proper belt loops and waistband panels are attached to the correct pant leg, and various procedural steps have been developed for organizing and handling the garment parts as they pass through their necessary procedures of cutting, folding, and sewing.

In the manufacture of waistbands it has been customary to assemble the various waistband components individually and by hand; that is, while sewing machines are utilized to actually form the stitches in the assembling process, many of the steps of placement, handling, folding and cutting of the garment parts have been done by hand. Of course, the hand assembly method requires a large number of machine operators and garment piece handlers, which is expensive and complicates the color coordinating of the garment parts. In a typical process the waistband panels which form the exterior portion of the waistbands of pants are individually attached to a continuous band of waistband facing material with a rocap seam. The waistband panels are usually alternately arranged in abutting and in overlapping relationship with respect to each other when attached to the facing material, so that when the facing material is cut to form individual waistband sections, alternate ones of the waistband panels extend beyond the ends of the waistband facing material in the portion thereof which ultimately forms the outer flap of the fly of the pants, so that the waistband panel can be folded behind the facing material without creating a large bulk of material in this area. This procedure requires the operator to fold back a predetermined length of waistband panel material of alternate ones of waistband panels when forming the rocap seam, and to insert the following waistband panels between the layers of the continuous facing material and the folded back portion of the waistband panels. The labels and belt loops must be individually handled and attached to the continuous facing material and waistband panels, and the sales tickets are usually attached to the waistband when the entire garment has been completed.

After the various items have been attached to the waistband sections, the sections must be cut away from one another by cutting through the continuous facing material at the ends of the waistband panels, and the individual waistband sections must then be stacked in proper order for attachment to the corresponding pant legs.

In a high speed garment fabricating process, these and the various other manual handling procedures are onerous, cumbersome, and the operators frequently make mistakes that result in faulty garment parts, which if discovered and discarded destroy the color coordination procedures, or if not discovered result in an imperfect garment.

SUMMARY OF THE INVENTION

Briefly described, the present invention comprises a method of making waistbands for pants or the like, which comprises joining waistband panels in end-to-end relationship and attaching the facing, labels, belt loops and sales tickets to the panels while in their joined relationship, and subsequently cutting the facing material and separating the waistband panels from each other. The belt loops are crimped adjacent their ends and the lower ends are folded over and cemented to the main portion of the belt loop. The upper crimped end is sewn to the waistband panel and the crimp forms a natural fold in the belt loop when the belt loop is folded down for attachment at its lower end to the waistband panel. In order to create an overlying relationship between the waistband panel and its attached facing material in alternate ones of the waistband sections, the facing material is cut with a straight line cut across its length at alternate ends of the waistband panels and is cut with a Y-shaped cut at the other alternate ends of the waistband panels to remove the facing material in the vicinity of the outer fly portion of the waistband.

Thus, it is an object of this invention to provide a method of making waistband for pants or similar garments which is fully automated, requires virtually no manual steps, reduces the frequency of imperfect garment production, increases the speed of garment production, and produces uniform garment parts.

Other objects, features and advantages of the present invention will become apparent upon reading the following specification, when taken into conjunction with the accompanying drawing.

DESCRIPTION OF THE PREFERRED EMBODIMENT

Figure 1:
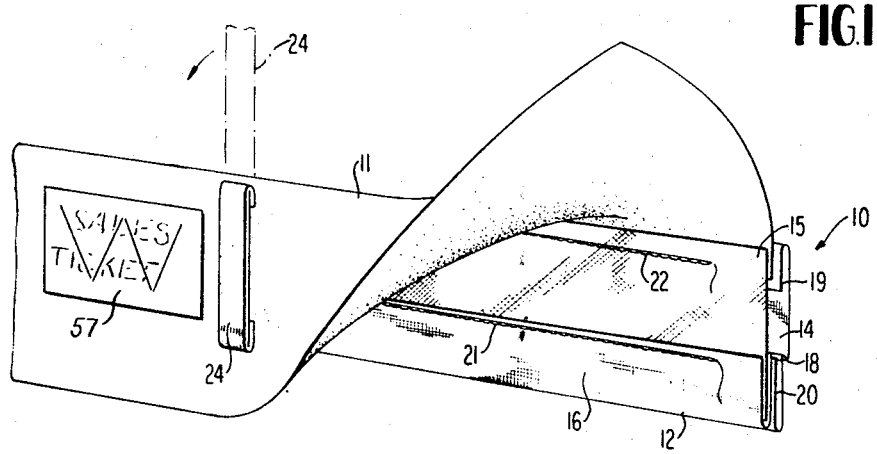
FIG. 1 is a perspective view of a portion of a waistband section, with portions thereof folded back for clarity.

Referring now in more detail to the drawing, in which like numerals indicate like parts throughout the several views, FIG. 1 shows a waistband 10 for pants or similar garments, which comprises an outer waistband panel 11 and the inner facing 12. Inner facing 12 comprises two basic sheets of material, inner sheet 14 and stiffening sheet 15. Inner sheet 14 is arranged so that it normally is placed adjacent the body of the wearer, while stiffening sheet 15 is placed outwardly of the wearer from inner sheet 14, between inner sheet 14 and waistband panel 11. The lower edge of stiffening sheet 15 is received in a U-shaped fold of tape 16. Inner sheet 14 is lap-folded at 18 in the vicinity of the upper edges of U-shaped tape 16, and both upper edge 19 and lower edge 20 of inner sheet 14 are folded inwardly adjacent stiffening sheet 15. Stiffening sheet 15, the upper edges of U-shaped tape 16, lower edge 20 of inner sheet 14 and the lap-fold 18 of inner sheet 14 are all sewn together by seam 21 which holds the lower portions of the sheets of inner facing 12 together.

Outer waistband panel 11 is inserted between the upper edges of stiffening sheet 15 and inner sheet 14 and these panels are sewn together by seam 22. This seam is called a rocap, and outer waistband panel 11 is folded over the upper protruding edge of stiffening sheet 15. Belt loops 24 are sewn to outer waistband panel 11, labels are sewn to the inside surface of inner facing 12, and sales tickets are sewn to outer waistband panel 11 between the belt loops, in a manner described more fully hereinafter.

Figure 2:
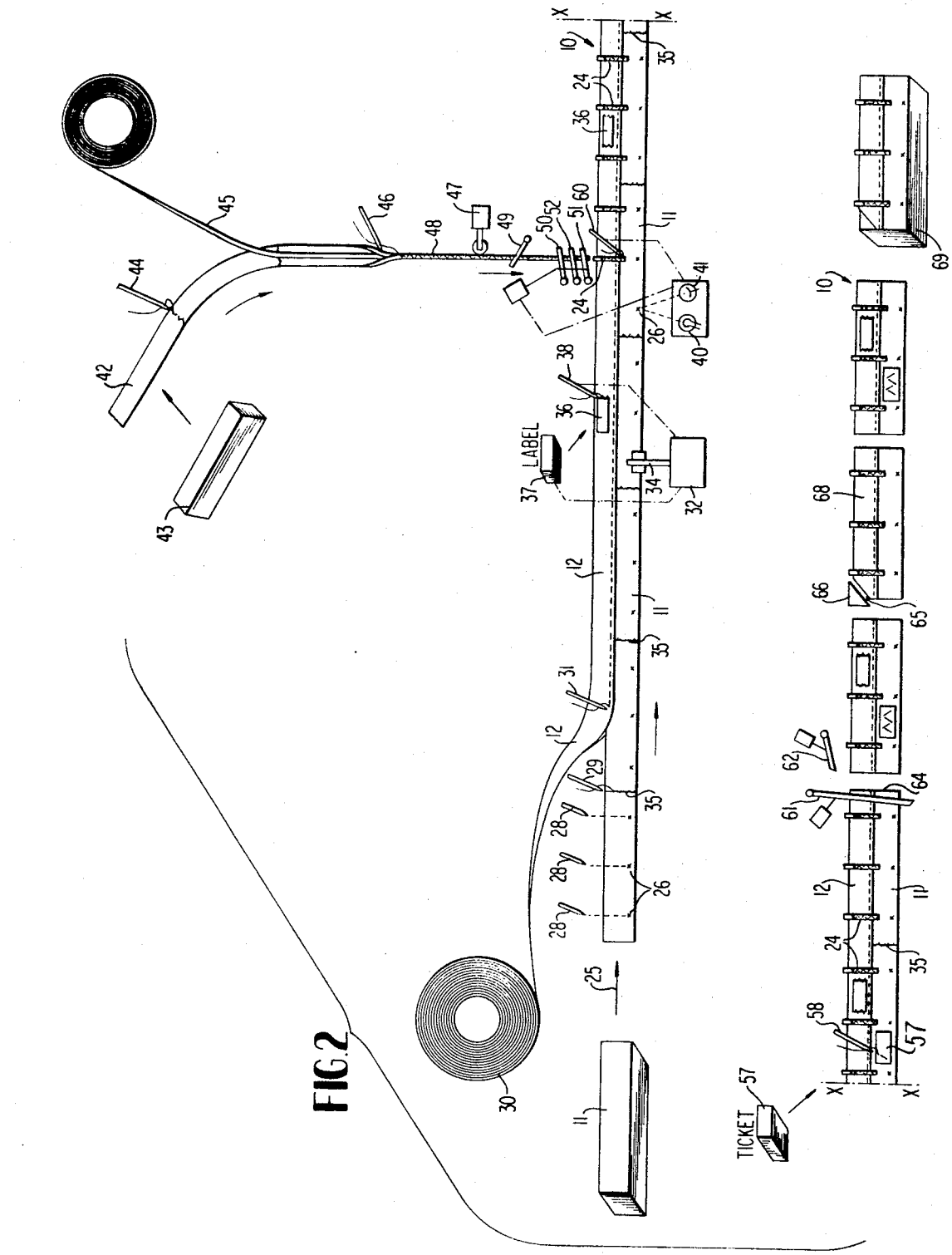
FIG. 2 is a progressive schematic illustration of the method of making waistbands.

Outer waistband panels 11 are cut from the same mass of material from which the pant legs and belt loops are cut, and as is shown in FIG. 2, are passed in an orderly manner through a predetermined path 25 for processing into assembled waistband sections. The individual waistband panels 11 are marked at 26 by marking pins 28 with a clear ink that is visible under ultraviolet light. Marks 26 are placed at spaced intervals along the lengths of waistband panels 11 which correspond to the ultimate placement of the belt loops 24.

Waistband panels 11 are further moved through path 25 and sewn tOgether in an end-to-end relationship by sewing machine 29. As the waistband panels 11 are further processed, inner facing material 12 is received from a roll or similar supply 30 and guided into abutting relationship with one edge of the series of waistband panels 11. The flaps of inner facing 12 are spread and the continuous edge of the waistband panels 11 is inserted between the flaps. Sewing machine 31 sews inner facing 12 to waistband panels 11 with a rocap seam which forms a continuous supply of waistband sections.

Seam feeling mechanism 32 engages waistband panels 11 with feeler 34 as the waistband panels pass along path 25. When a seam 35 formed by sewing machine 29 is detected by feeler 34, a label 36 is passed from a supply of labels 37 into position adjacent inner facing 12, and sewing machine 38 sews label 36 onto inner facing 12. The arrangement is such that label 36 is positioned in a location which is spaced from the position of the detected seam 35, and one label is applied to inner facing 12 for every other waistband panel 11.

Figure 3:
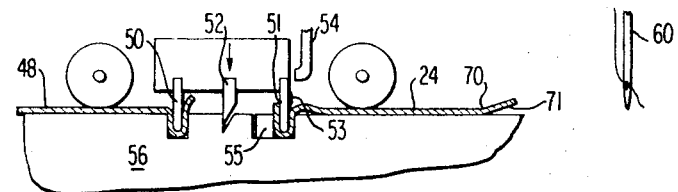
FIGS. 3, 4, and 5 are progressive schematic illustrations of the method of cutting, crimping, folding and cementing the belt loops.
Figure 4:
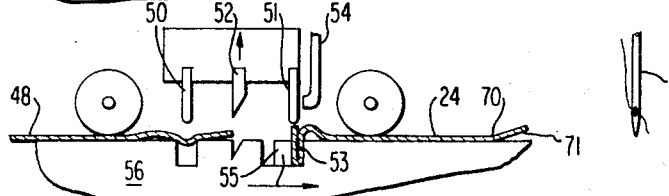
Figure 5:
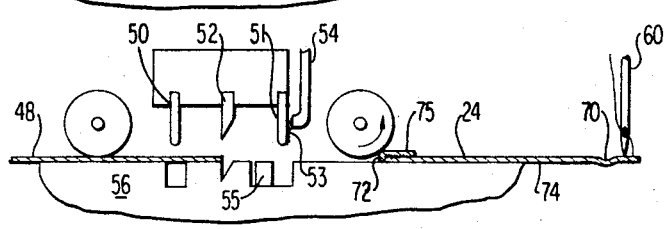

As the continuous supply of waistband sections proceeds further along path 25, an ultraviolet light 40 illuminates the marks 26 previously applied by marking devices 28, and detector 41 detects the marks and functions to apply belt loops 24 to the waistband panels 11. Belt loops 24 are formed by connecting belt loop panels 42 in end-to-end relationship by sewing machine 44, feeding the belt loop panels continuously about a stiffening tape 45, and sewing the belt loop panels about the tape with sewing machine 46. The continuous supply of belt loop material 48 is fed toward path 25 through which the continuous series of waistbands are being passed. Feeler device 47 detects the slight break in continuity in the length of the belt loop material 48 to determine the ends of the belt loop panels 42, causing cutting mechanism 49 to cut the continuous supply of belt loop material 48 at the ends of the belt loop panels. As the supply of belt loop material 48 continues toward path 25, it passes beneath crimping blades 50 and 51 and cutting blade 52. As is illustrated in FIGS. 3–5, cutting blade 52 functions to cut the belt loop material 48 in the proper lengths to form the belt loops 24, and crimping blades 50 and 51 function to form a crimp at the ends of the adjacent belt loops. Adhesive 53 is applied to the lower end of each belt loop at its crimp by the application of adhesive through conduit 54 to crimp blade 51. The adhesive is wiped from the crimp blade onto the belt loop. When crimp blade 51 is withdrawn from the belt loop, clamp element 55 is moved from the position illustrated in FIG. 3 to the position illustrated in FIG. 4 to squeeze or press the crimped end of the belt loop closed to form a fold in the belt loop. The squeezing or pressing of the end of the belt loop in this manner causes the adhesive 53 to hold the fold in the belt loop. Crimping blades 50 and 51 and cutting blade 52 are moved toward and away from female die 56 and clamp element 55 moves laterally within the die to perform its folding or squeezing function.

As belt loop 24 is moved further toward path 25 and applied to the continuous waistband material, sewing machine 60 sews the crimped unfolded end or upper end of the belt loop to the waistband panel 11. This crimping, folding and sewing function is repeated each time detector 41 senses the presence of a mark 26 on the waistband panels 11.

The crimp 70 formed in the upper end portion 71 of each belt loop is spaced from the fold 72 in the belt loop at an equal distance in each belt loop, so that when the belt loop is applied to the waistband panel, it will tend to fold at its crimp, and the lower end of the belt loop will then be disposed at a prescribed distance from the upper end thereof. Thus, each belt loop will be formed with a uniform length and will include a central body portion 74, crimped end 71, folded end 75 and adhesive 53 applied between folded end 75 and central body portion 74, and the subsequent operation of tacking the lower folded end of the belt loop to the waistband panel will be greatly simplified. Furthermore, since the initial sewing of the upper inner end of the belt loop to the waistband panel is done automatically, all of the belt loops will be uniformly located on the waistband panel.

To assist in the crimping function, the crimping blades 50 and 51 can be heated if desired to assure that a definite crimp is created in the belt loop.

As the continuous series of waistband sections move further along path 25, tickets 57 are applied to the waistband panels 11, and sewing machine 58 functions to form a loose stitch or basting stitch through the tickets and the waistband panels. Tickets 57 are sales tickets fabricated of paste board, paper or similar material, and the garment size style and other identifying information is applied to the tickets. The basting stitch formed by sewing machine 58 allows the tickets to be easily stripped from the garment by the purchaser.

As the continuous series of waistband sections move further along path 25, cutting devices 61 and 62 operate to cut inner facing 12 at locations corresponding to seams 35 of waistband panels 11. Cutting device 61 operates to cut a straight cut across the length of inner facing 12 at each seam 35 and through each seam 35, while cutting device 62 functions to cut a slanted cut in inner facing 12 at alternate ones of seams 35. In this manner, straight cuts 64 and Y-shaped cuts 65 are formed in inner facing 12 and the waistband sections 68 are separated from each other. The Y-cut 65 causes a piece of material 66 to be removed from alternate ones of waistband sections 68. As the waistband sections 68 continue to pass along path 25, they are formed in a stack 69 where they can be transported to the vicinity of the pant legs from which waistband panels 11 and belt loop panels 42 were originally cut, matched together, and formed into pairs of pants.

While marking devices 28 have been illustrated for the purpose of applying marks 26 to waistband panels 11 as the waistband panels pass along path 25, it should be understood that marks 26 can be applied to waistband panels 11 during the initial cutting process or between the cutting process and the point where waistband panels 11 reach pant 25. Furthermore, while marks 26 have been disclosed as being of a fluorescent liquid which is visible only under ultraviolet light, various other marks or indicia can be applied. For instance, the marks 26 can be notches cut in the edge of waistband panels 11, holes, or can be marks detectable by other detecting devices.

Cutting devices 61 and 62 which cut apart waistband sections 58 can be controlled by seam feeling mechanism 32 or by a similar seam feeling mechanism (not shown) which is in closer proximity to the location of the cutting devices. Cutting devices 61 and 62 have been shown as operating to cut alternate straight and Y-cuts across the breadth of waistband sections 68; however, cutting device 62 can be arranged to cut various different cuts in inner facing 12, as may be desired. For instance, Y-cut 65 can be a rectangular cut or any other shaped cut, to properly form the fly fold of the pant. If a relatively stiff outer fly fold is desired, cutting mechanism 62 can be de-energized and the entire inner facing 12 can be used in the outer fly fold. On the other hand, if a flexible outer fly fold is desired in the pant, the cut 65 made by cutting device 62 can be of a rectangular shape to remove a large amount of inner facing 12 from the vicinity of the fly fold.

While this invention has been described in detail with particular reference to preferred embodiments thereof, it will be understood that variations and modifications can be effected within the spirit and scope of the invention as described hereinbefore and as defined in the appended claims.

I claim:

1. In an apparatus for forming waistband panels or the like, the combination therewith of belt loop forming apparatus comprising cutting means for cutting belt loop lengths from a supply of belt loop material, crimping means for forming a crimp in one end of the belt loop and folding means for forming a fold in the other end of the belt loop.

2. The invention of claim 1 and wherein said folding means includes means for applying adhesive to the belt loop.

3. A belt loop comprising an elongated strip of material defining a central body, a crimp adjacent one end thereof, the other end folded back over a portion of the central body, and adhesive applied to the folded portion thereof.

4. The belt loop of claim 3 and wherein the adhesive is applied to the facing surfaces of said folded end and said central body.

5. Apparatus for forming belt loops or the like comprising means for moving a length of belt loop material along a path, cutting means for cutting the length of belt loop material into shorter lengths, crimping means positioned on opposite sides of said cutting means for forming crimps in the belt loop material, and adhesive applying means adjacent one of said crimping means for applying adhesive to the belt loop material.

6. A method of forming belt loops or the like comprising passing a length of belt loop material along its length through a predetermined path, cutting the belt loop material into shorter lengths to form belt loops, crimping the belt loops at one of their ends, folding the belt loop at its other end, and applying an adhesive to the folded end of the belt loop.

* * * * *